(12) United States Patent
Pohl et al.

(10) Patent No.: US 10,894,707 B2
(45) Date of Patent: Jan. 19, 2021

(54) BEVERAGE DISPENSING APPARATUS METHOD AND APPARATUS

(71) Applicant: Intel Corporation, Santa Clara, CA (US)

(72) Inventors: Daniel Pohl, Puchheim (DE); Roman Schick, Furstenfeldbruck (DE); Fengqian Gao, Shanghai (CN); Wenlong Yang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/473,195

(22) PCT Filed: Mar. 29, 2017

(86) PCT No.: PCT/CN2017/078522
§ 371 (c)(1),
(2) Date: Jun. 24, 2019

(87) PCT Pub. No.: WO2018/176249
PCT Pub. Date: Oct. 4, 2018

(65) Prior Publication Data
US 2020/0095110 A1    Mar. 26, 2020

(51) Int. Cl.
*B67D 1/08* (2006.01)
*A47J 31/52* (2006.01)
*G01C 3/08* (2006.01)

(52) U.S. Cl.
CPC .......... *B67D 1/0888* (2013.01); *A47J 31/525* (2018.08); *G01C 3/08* (2013.01); *A47J 2203/00* (2013.01)

(58) Field of Classification Search
CPC ... B67D 1/0888; A47J 2203/00; A47J 31/525; G01C 3/08
(Continued)

(56) References Cited

U.S. PATENT DOCUMENTS 4,437,497 A * 3/1984 Enander .................... B65B 3/26
                                                    137/386
6,789,585 B1 * 9/2004 Janke ..................... F25D 23/126
                                                    141/198
(Continued)

FOREIGN PATENT DOCUMENTS

CN      1576228 A    2/2005
CN    101177232 A    5/2008
(Continued)

OTHER PUBLICATIONS

International Search Report and Written Opinion dated Jan. 4, 2018 for International Application No. PCT/CN2017/078522, 12 pages.

*Primary Examiner* — Timothy L Maust
(74) *Attorney, Agent, or Firm* — Schwabe, Williamson & Wyatt, P.C.

(57) ABSTRACT

Apparatus, method and storage medium associated with a beverage dispensing apparatus are disclosed herein. In embodiments, a beverage dispensing apparatus may include a dispenser to dispense a beverage into a beverage container placed underneath the dispenser; one or more sensors to sense and collect depth data associated with the beverage container; and a controller coupled to the dispenser and the one or more sensors to control the dispenser's dispensation of the beverage, in accordance with a capacity of the beverage container inferred based at least in part on the collected depth data associated with the beverage container. Other embodiments may be disclosed or claimed.

19 Claims, 5 Drawing Sheets

(58) Field of Classification Search
USPC .................................... 141/94, 95, 192, 198
See application file for complete search history.

(56) References Cited

U.S. PATENT DOCUMENTS

| | | | | |
|---|---|---|---|---|
| 7,673,661 B2* | 3/2010 | Chase | ................... | B67D 1/0858 |
| | | | | 141/360 |
| 7,735,687 B2* | 6/2010 | Fukushima | ............... | B08B 3/00 |
| | | | | 118/302 |
| 8,109,301 B1* | 2/2012 | Denise | ................... | F25D 29/001 |
| | | | | 141/360 |
| 8,151,832 B1* | 4/2012 | Dorney | .............. | A47G 19/2227 |
| | | | | 141/360 |
| 2008/0164274 A1 | 7/2008 | Stettes | | |
| 2014/0110018 A1* | 4/2014 | Scarvelli | .............. | B67D 1/0891 |
| | | | | 141/64 |
| 2014/0224375 A1* | 8/2014 | Willis | ..................... | B67D 1/16 |
| | | | | 141/1 |
| 2014/0230960 A1* | 8/2014 | Ciavarella | ............ | A47K 5/1211 |
| | | | | 141/83 |
| 2015/0059922 A1* | 3/2015 | Thompson | ............. | B65D 49/00 |
| | | | | 141/94 |
| 2015/0122371 A1* | 5/2015 | Calvin | ................... | F17C 13/025 |
| | | | | 141/4 |
| 2015/0329347 A1* | 11/2015 | Veldhi | .................. | B67D 3/0003 |
| | | | | 141/1 |
| 2016/0376141 A1* | 12/2016 | Springer | ................... | F16K 31/10 |
| | | | | 141/1 |
| 2018/0022596 A1* | 1/2018 | Grice | .................... | B67D 7/302 |
| | | | | 141/1 |
| 2019/0144255 A1* | 5/2019 | Dresser | ................... | A47F 1/085 |
| | | | | 141/94 |

FOREIGN PATENT DOCUMENTS

JP            08192900 A      7/1996
WO    WO2014095985 A1      6/2014

\* cited by examiner

BEVERAGE DISPENSING APPARATUS METHOD AND APPARATUS

CROSS REFERENCE TO RELATED APPLICATIONS

The present application is a national phase entry under 35 U.S.C. § 371 of International Application No. PCT/CN2017/078522, filed Mar. 29, 2017, entitled "BEVERAGE DISPENSING APPARATUS METHOD AND APPARATUS", which designated, among the various States, the United States of America. The Specifications of the PCT/CN2017/078522 Application is hereby incorporated by reference.

TECHNICAL FIELD

The present disclosure relates to the field of food and beverage apparatuses. In particular, the present disclosure is related to a beverage dispensing apparatus and method.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Beverage dispensing apparatus are used worldwide. Common examples include coffee machines, soft drink machines, cocktail mixing machines, and so forth. Even the most high end versions of these machines have various disadvantages. For example, for coffee machines, when use in an office where users tend to have their own coffee cups that come in different sizes, there is no convenient way of filling the various cups accordingly. Some machines offer basic size selections like small, medium and large, which usually never fully fit the cup being filled. Additionally, for some beverages with multiple ingredients, such as flavored espresso latte, the mixture of espresso, milk and flavored syrup should be properly matched. Further, the proper amounts may need to be filled in a proper order, and not allowing topping off in the event of an initial under fill.

In practice, user cups are either not filled enough and the users press the selection button again, or incorrectly over selecting the beverage size, which may produce too much beverage, resulting in overflow. Overflowing of hot liquid potentially can cause injuries to the users, specifically if the users do not notice the overflow soon enough.

In the case of soft drink dispensers, users typically fill up their cups with ice cubes, and then have to keep a button pressed to ensure the right amount of soft drink is dispensed, without overflowing.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Apparatus, method and storage medium associated with a beverage dispensing apparatus are disclosed herein. In embodiments, a beverage dispensing apparatus may include a dispenser to dispense a beverage into a beverage container placed underneath the dispenser; one or more sensors to sense and collect geometry data associated with the beverage container; and a controller coupled to the dispenser and the one or more sensors to control the dispenser's dispensation of the beverage, in accordance with a capacity of the beverage container determined based at least in part on the collected geometry data associated with the beverage container. The apparatus and related aspects will be further described below with references to the accompanying Figures.

In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous. The terms "motor" and "engine" are synonymous unless the context clearly indicates otherwise.

As used hereinafter, including the claims, the term "module" may refer to, be part of, or include an Application Specific integrated Circuit (ASIC), an electronic circuit, a processor (shared, dedicated, or group) and/or memory (shared, dedicated, or group) that execute one or more software or firmware programs having one or more machine instructions (generated from an assembler or from a high level language compiler), a combinational logic circuit, and/or other suitable components that provide the described functionality.

Figure 1:
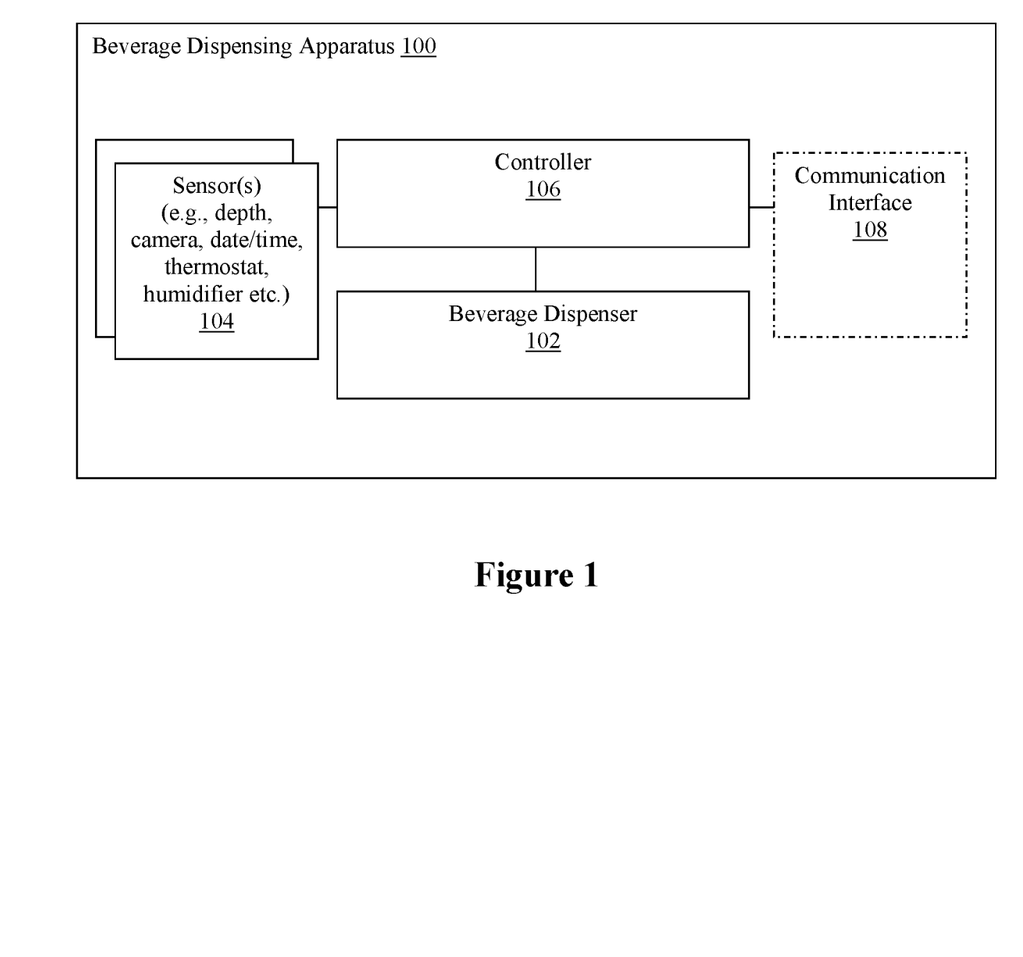
FIG. 1 illustrates a block diagram view of a beverage dispensing apparatus of the present disclosure, in accordance with various embodiments.

Referring now to FIG. 1, wherein a block diagram view of a beverage dispensing apparatus of the present disclosure, in accordance with various embodiments, is shown. As illustrated, beverage dispensing apparatus 100 may include beverage dispenser 102, sensors 104, and controller 106, coupled with each other. Beverage dispenser 102 may be configured to dispense a beverage into a beverage container (not shown) placed e.g., underneath. Sensors 104 may be configured to sense and collect geometry data associated with the beverage container. Controller 106 may be coupled to beverage dispenser 102 and sensors 104 to control the dispenser's dispensation of the beverage, in accordance with a capacity of the beverage container determined based at least in part on the collected depth data associated with the beverage container.

In embodiments, the beverage being dispensed by beverage dispenser 102 may be any one of a number of beverages known in the art. Examples of the beverage being dispensed may include, but are not limited to, water, coffee drinks, soft drinks, mix alcoholic drinks, wine, and so forth. Beverage dispenser 102, except for having interface circuitry to allow controller 106 to control an amount of beverage being dispensed, may be any one of a number of corresponding dispensers known in the art.

In some embodiments, sensors 104 may include one or more depth sensors configured to sense and collect geometry data, such as depth data, associated with the beverage container placed underneath beverage dispenser 102. The geometry data sensed and collected may in turn be made available to controller 106 for use to determine a capacity of the beverage container, and in turn, control an amount of the beverage dispensed by beverage dispenser 102, based on the determined capacity. The one or more depth sensors, except for their use, may be any one of a number of depth sensors or equivalents known in the art. For examples, a depth sensor may be effectively implemented using two stereo cameras, a camera movable to take images in two or more vertical positions, or other like functional equivalent arrangements.

In some embodiments, sensors 104 may further include additional sensors to sense and collect user information, contextual information or environment information. In particular, in some embodiments, sensors 104 may further include a camera to capture one or more pictures of a user of beverage dispensing apparatus 100. The captured picture may in turn be made available to controller 106 to perform facial recognition to identify the user. The controller 106 may then further obtain preferences, consumption history or habits of the user, and in turn, use the obtained preferences, consumption history or habits to control beverage dispenser 102. For example, controller 106 may use the obtained information to control the beverage selection, e.g., espresso, latte, or cappuccino, or e.g., selecting milk or half and half or the amount/type of sweetener for a coffee drink. The camera, except for its use, may be any one of a number of depth cameras known in the art, e.g., a RGB (red, green, blue) camera.

In other embodiments, sensors 104 may alternatively or additionally include date/time sensors sense and collect date/time data. The sensed/collected date/time data may in turn be made available to controller 106 to determine e.g., season of the year, spring summer, fall or winter, and/or time of day, morning, noon, afternoon or evening, and so forth. The controller 106 may then further control beverage dispenser 102 based on the determined season or time of day, e.g., increase the temperature of the beverage on a winter day, lower the temperature of the beverage on a summer day, increase the amount of coffee in a coffee drink in the morning, decrease the amount of coffee in a coffee drink in the evening, and so forth. The date/time sensors, except for their use, may be any one of a number of date/time sensors known in the art.

In still other embodiments, sensors 104 may alternatively or additionally include environment sensors, such as thermostat, humidifier, and so forth, to sense and collect environmental data, such as temperature, humidity and so forth. The sensed/collected environmental data may in turn be made available to controller 106 to determine environmental conditions, e.g., whether it is a cold day, a hot and muggy day, and so forth. The controller 106 may then further control beverage dispenser 102 based on the determined environmental conditions, e.g., increase the temperature of the beverage for a cold day, lower the temperature of the beverage on a hot and muggy day, and so forth. The environment sensors, except for their use, may be any one of a number of environment sensors known in the art.

In still other embodiments, sensors 104 may alternatively or additionally include one or more bio-sensors, e.g., a camera. The one or more bio-sensors may be configured to sense and collect bin data of a user. The sensed/collected bio data may in turn be made available to controller 106 to determine the presence or absence of a human limb at the dispensation path of dispenser 102. On determination of the presence of a human limb, e.g., the user's hand, at the dispensation path of dispenser 102, controller 106 may control dispenser 102 to terminate dispensing, of a hot liquid to avoid causing injury to the user.

Figure 6:
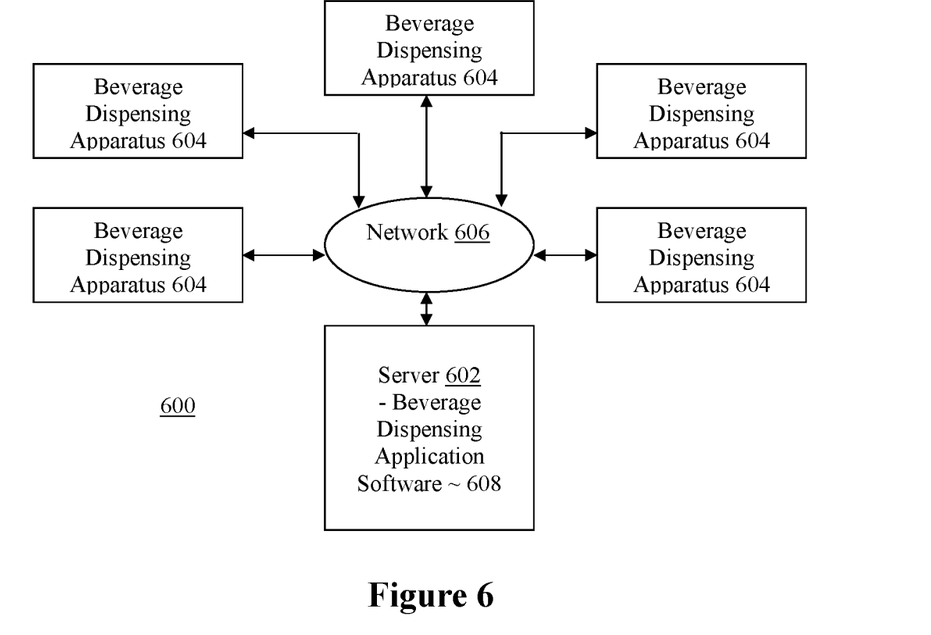
FIG. 6 illustrates a network of beverage dispensing apparatus, in accordance with various embodiments.

Still referring to FIG. 1, in some embodiments, beverage dispensing apparatus 100 may further include an optional communication interface 108 to receive and send data. In some embodiments, communication interface 108 may be configured to receive the earlier described user identification data, context data, or environment data (in lieu of having the corresponding camera, date/time or environment sensors locally collect the user identification data, context data, or environment data). For examples, in some embodiments, communication interface 108 may be configured to receive user identification data, context data, or environment data from a proximally located mobile device, such as a mobile phone or a tablet, or from a remotely disposed server (FIG. 6, to be described more fully below). Thus, in embodiments, communication interface 108 may be configured to support Bluetooth® communication, Near Field Communication (NFC), WiFi or Cellular communications.

In some embodiments, communication interface 108 may be configured to send usage data to a remote disposed cloud server (See FIG. 6 below, to be described more fully later), e.g., for aggregation or otherwise used to control or improve operation of beverage dispensing apparatus 100. The usage data may include, but are not limited to, data on beverages dispensed and user, contextual and/or environment information associated with the beverages dispensed and so forth.

Figure 2:
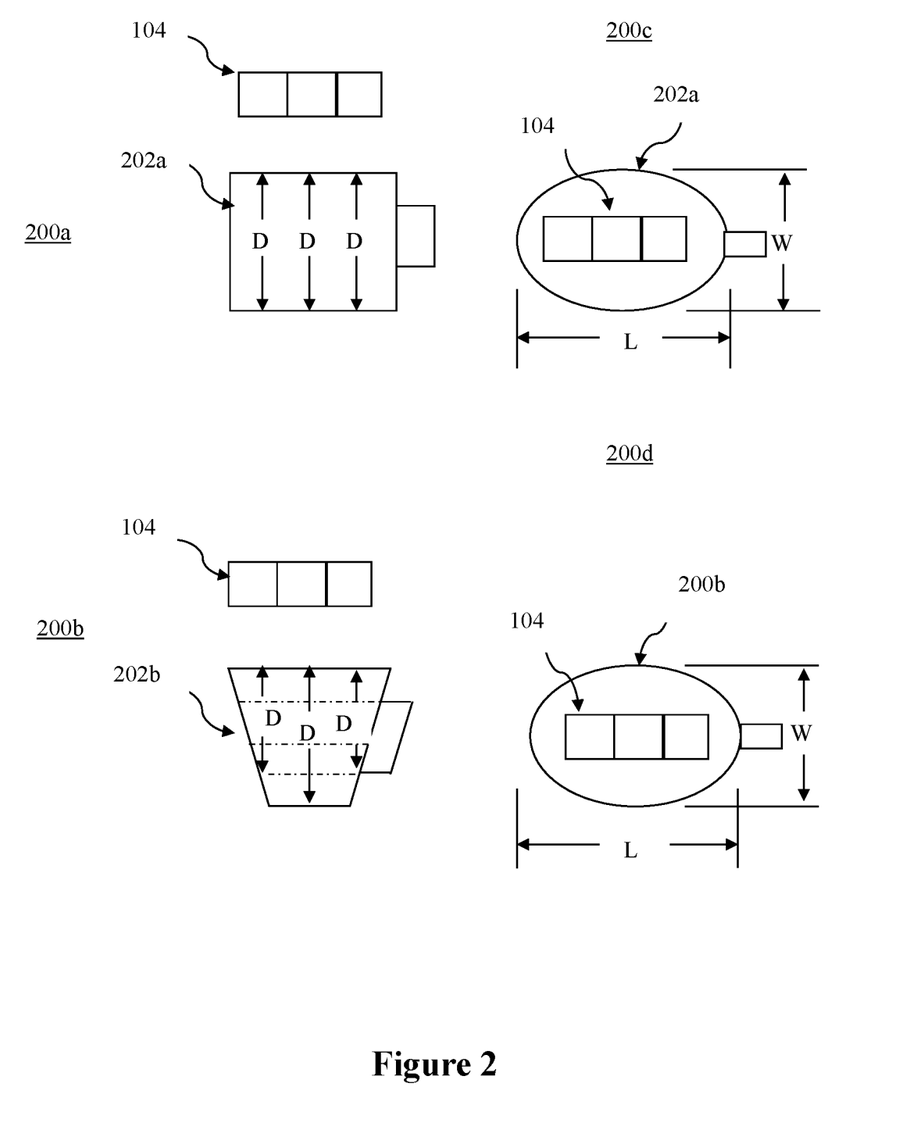
FIG. 2 illustrates geometry data sensing of various beverage containers, according to some embodiments.

Referring now to FIG. 2, wherein geometry data sensing of various beverage containers, according to some embodiments, is illustrated. Shown are two respective side views 200a and 200b and two respective top views 200c and 200d of two beverage containers 202a and 202b, along with sensors 106. Beverage container 202a may be representative of beverage containers with uniform depth, whereas beverage container 202b may be representative of beverage containers with variable depth. As illustrated, sensors 104 may sense the depth (D) of the portion of beverage container 202a/202b underneath the sensor, as well as the relevant metrics of a cross section plane of beverage container 202a/202b (e.g., L & W of the example elliptical shaped cross section plane or simply the radius R (when L=W) of an example circular shaped cross section plane (not shown).

Collectively, these (and other relevant metrics, if necessary, for other shapes) may then allow controller 106 to determine the capacity of beverage container 202a and 202b. In some embodiments, controller 106 may construct a 3-dimensional (3D) model of the beverage container, based on the collected geometry data, and in turn, determine the volume/capacity of the beverage container using the 3D model. In some embodiments, for beverage container 202a, the volume may be estimated as $(\pi TL\ W/4)(D)$ or $(\pi TR^2)(D)$ when L=W. For beverage container 202b, the volume may be determined as the sum of the volumes of the different horizontal sections (as partitioned by the dotted line). For the volume of each horizontal section, the volume may be similarly estimated as earlier described for beverage container 202a. The number of horizontal sections employed may be dependent on the sloping angle of the side wall and/or the accuracy desired.

The above examples are meant to be illustrative and not limiting. The capacity of a beverage container may be estimated with the sensed geometry data using other estimation approaches.

Figure 3:
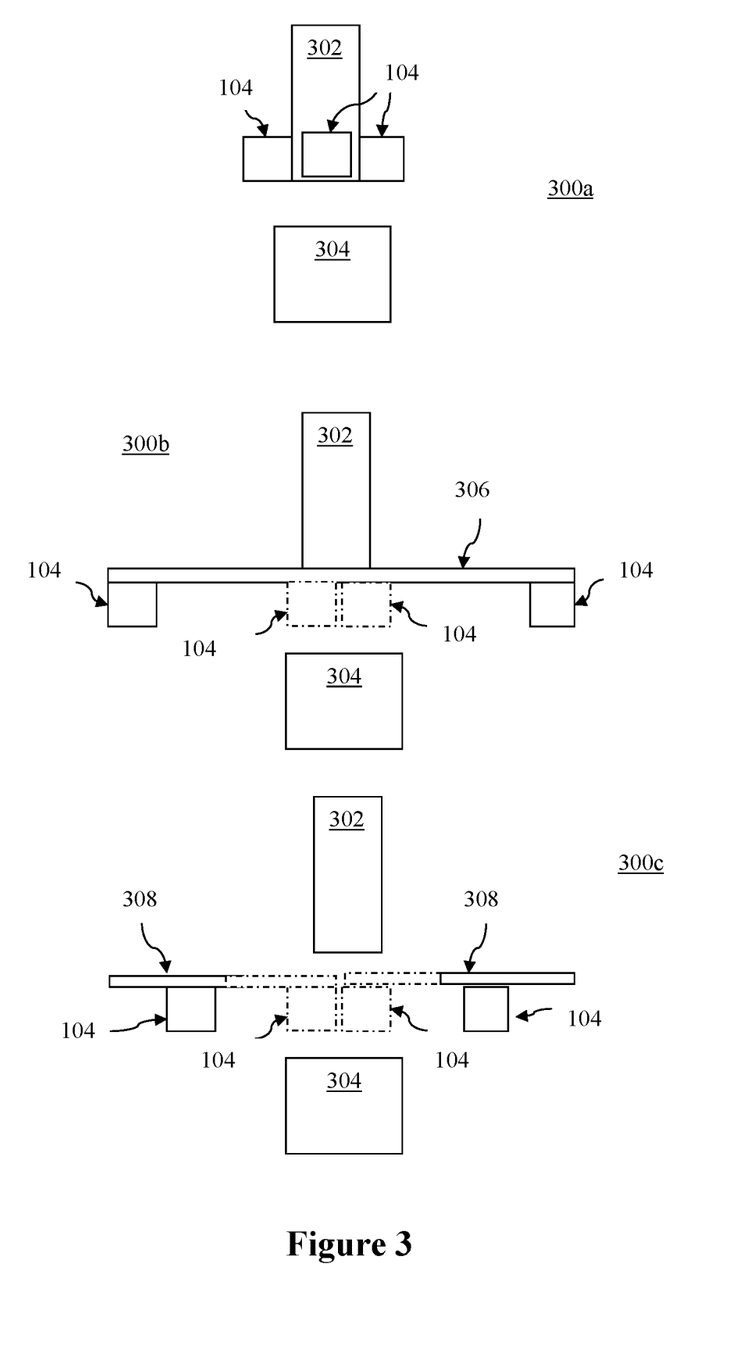
FIG. 3 illustrates sensor arrangements, according to various embodiments.

Referring now to FIG. 3, wherein a number of sensor arrangements according to various embodiments, are illustrated. More specifically, three example arrangements 300a-300c are shown. For the example embodiment 300a, sensors 104 may be disposed around dispensing spout 302 to sense and collect the various geometry metrics of beverage container 304. For the example embodiment 300b, rail 306 may be provided. Sensors 104 may be movably attached to rail 306, and normally disposed at remote ends of rail 306. During operation, using rail 306, sensors 104 may be moved above beverage container 304 as depicted by the dotted line sensors 106 to sense and collect the various geometry metrics of beverage container 304. For the example embodiment 300c, one or more arms 308 that can extend or swivel may be provided. Sensors 104 may be attached to the one or more arms 308. Normally, arms 308 may be retracted, or at rest at a position not above the location where beverage container 304 would be placed. During operation, extending or swiveling the one or more arms 308, sensors 104 may be moved above beverage container 304 as depicted by the dotted line sensors 104 to sense and collect the various geometry metrics of beverage container 304.

The above examples are meant to be illustrative and not limiting. Sensors 104 may be statically positioned or dynamically moved in place, when needed, to sense and collect various relevant geometry metrics using other estimation approaches.

Figure 4:
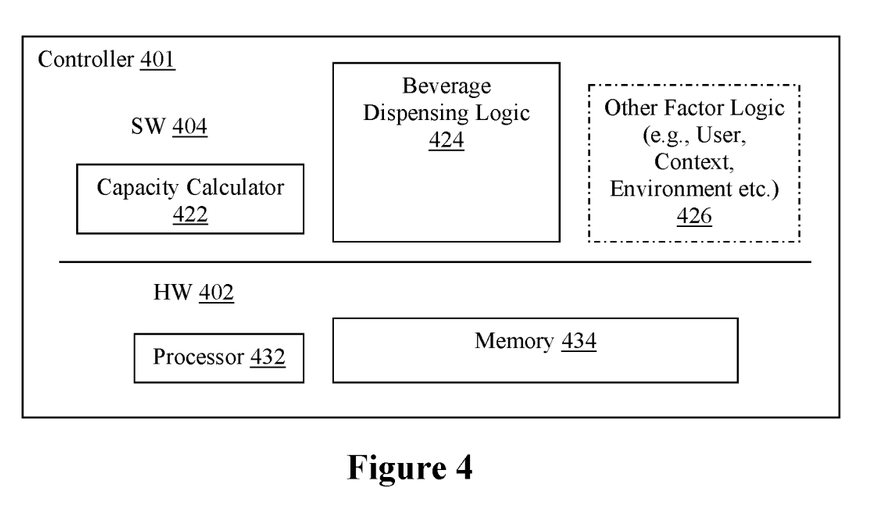
FIG. 4 illustrates a controller, according to some embodiments.

Referring now to FIG. 4 wherein a block diagram view of a controller, according to some embodiments, is shown. As illustrated, in embodiments, controller 401 (which may be controller 106 of FIG. 1) may include hardware 402 and software 404. Hardware 402 may include processor 432 and memory 434. Software 44 may include capacity calculator 422, beverage dispensing logic 424, and optional other factor logic 426.

Processor 432 may be ally one of a number of single core or multi-cores processor known in the art. Memory 434 may be any one of a number of volatile or non-volatile storage medium known in the art, including, but are not limited to, static random access memory (SRAM), dynamic random access memory (DRAM), solid state memory, and so forth.

Capacity calculator 422 may include instructions configured to cause controller 401, in response to execution of the instructions by processor 432, to determine/estimate capacity of a beverage container. In embodiments, as described earlier, controller 401 may be caused to determine/estimate capacity of a beverage container based at least in part on a number of geometry metrics associated with the beverage container that are sensed and collected in real time. In particular, controller 401 may be caused to determine/estimate capacity of a beverage container based at least in part on depth and other geometry data associated with the beverage container sensed and collected.

Beverage dispensing logic 424 may include instructions configured to cause controller 401, in response to execution of the instructions by processor 432, to dispense a beverage into a beverage container, based at least in part on the capacity of the beverage container determined/estimated by capacity calculator 422.

In some embodiments where sensors to sense and collect user identification, context and/or environment data associated with a beverage container are provided, other factor logic may be configured to process the sensed and collected user identification, context and/or environment data associated with the user, the context or the environment, and provide the process results to beverage dispensing logic 424 for use to control dispensing of a beverage.

Instructions of capacitor calculator 422, beverage dispensing logic 424 and other factor logic 426 may comprise assembler or machine instructions supported by processor 432, or other high level language instructions, such as C, that can be compiled into the supported assembler or machine instructions of processor 432.

Figure 5:
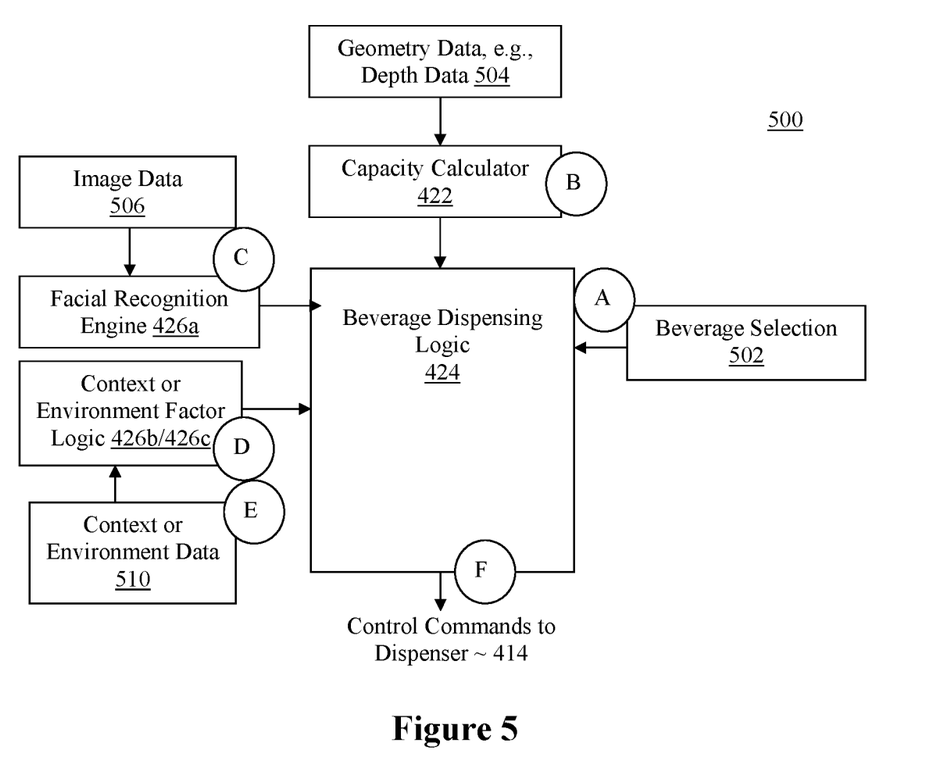
FIG. 5 illustrates a process for dispensing beverages, according to some embodiments.

Referring now to FIG. 5, wherein a process for dispensing beverages, according to some embodiments, is shown. As illustrated, process 500 may include operations performed at nodes A-F. At node A, a beverage selection 502 may be received by beverage dispensing logic 424. At node B, geometry data, such as depth data, 504 may be used by capacity calculator 422 to determine and estimate the capacity of a beverage container. In some embodiments, process 500 may proceed to node F, where the determined/estimated capacity of the beverage container may be provided to beverage dispensing logic to control dispensing of a beverage.

In other embodiments, process 500 may proceed to nodes C, D and/or E. At node C, image data 506 may be sensed/collected or received, and used by facial recognition engine 426a (an instance or function of other factor logic 426) to recognize and identify the user. The identity of the user may then be provide to beverage dispensing logic 424, which in turn may use to retrieve data about the user. The retrieved user data may be further used by beverage dispensing logic 424 in generating control commands 414 to control the dispenser hardware in dispensing a beverage at node F.

At node D/E, context/environment data 506 may be sensed/collected or received, and processed by context/environment factor logic 426b/426c (instances or functions of other factor logic 426). The processing results of the context/environment data may be further used by beverage dispensing logic 424 in generating control commands 414 to control the dispenser hardware in dispensing a beverage at node F.

In some embodiments, image data 506 may be continuously received. For these embodiments, engine 426a may also use the successive images 506 to continuously monitor and determine the presence or absence of a human limb at the dispensation path of dispenser 106. On determination of the presence or absence of a human limb at the dispensation path of dispenser 106, beverage dispensing logic 424 may modify its operation at node F, e.g., by temporarily pausing the dispensation of a hot beverage.

Referring now to FIG. 6, wherein a network of beverage dispensing apparatuses, in accordance with various embodiments, is illustrated. As shown, in embodiments, network of beverage apparatuses 600 may comprise a plurality of beverage dispensing apparatuses 604, and server 602 coupled with each other via network 606. Each of beverage dispensing apparatuses 604 may be a less capable version of beverage dispensing apparatus 100 or 400. Some of the earlier described capabilities of beverage dispensing apparatus 100 or 400, instead of being provided locally by beverage dispensing apparatuses 604, may be provided by beverage dispensing application 608 operating on server 602 instead. For examples, these capabilities may include, but are not limited to estimating capacity of a beverage container, facial recognition of a user, date/time context data, and so forth.

In embodiments, beverage dispensing application 608 may be configured to perform the operations earlier described for capacity calculator 422, beverage dispensing logic 424 and/or other factor logic 426. In embodiments, beverage dispensing application 608 may also be configured to aggregate the usage data received from the various beverage dispensing apparatus 604, and factor in the aggregated usage data when controlling beverage dispensing apparatuses 604. Server 602 may be any one of a number of servers known in the art. Network 606 may be any one of a number of wired/wireless, public or private networks known in the art, including e.g., the Internet.

Figure 7:
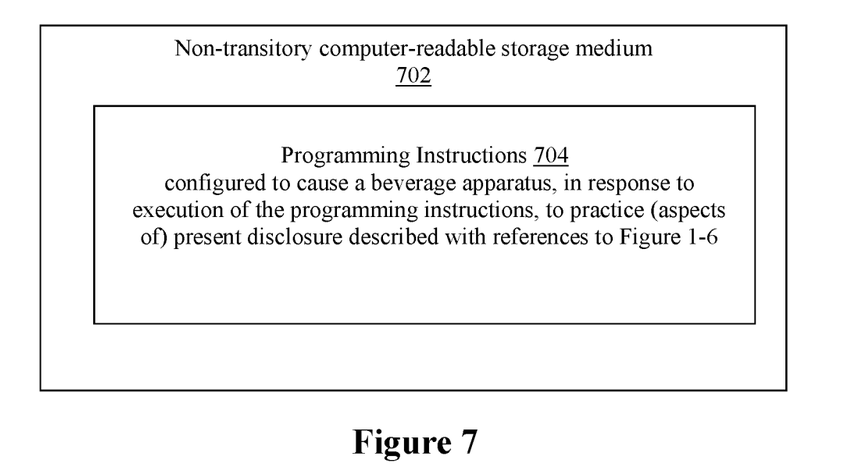
FIG. 7 illustrates an example computer-readable storage medium with instructions configured to enable a beverage dispensing apparatus to practice aspects of the present disclosure, in accordance with various embodiments.

FIG. 7 illustrates an example non-transitory computer-readable storage medium having instructions configured to practice all or selected ones of the operations associated with beverage dispensing apparatus 100/400 and/or beverage dispensing application 608/server 602, earlier described, in accordance with various embodiments. As illustrated, non-transitory computer-readable storage medium 702 may include a number of programming instructions 704. Programming instructions 704 may be configured to enable an apparatus, e.g., beverage dispensing apparatus 100/400 or server 602, in response to execution of the programming instructions, to perform various beverage dispensing related operations earlier described in alternate embodiments, programming instructions 704 may be disposed on multiple non-transitory computer-readable storage media 702 instead. In still other embodiments, programming instructions 704 may be encoded in transitory computer readable signals.

Referring also to FIG. 4, for some embodiments, processor 432 may be packaged together with a computer-readable storage medium having programming instructions 704 configured to practice all or selected aspects of beverage dispensing related operations earlier described. For one embodiment, processor 432 may be packaged together with a computer-readable storage medium having programming instructions 704 to form a System in Package (SiP). For one embodiment, processor 432 may be integrated on the same die with a computer-readable storage medium having programming instructions 704. For one embodiment, processor 432 may be packaged together with a computer-readable storage medium having programming instructions 704 to form a System on Chip (SoC).

Example 1 may be an apparatus for dispensing beverages, comprising: a dispenser to dispense a beverage into a beverage container; one or more sensors to sense and collect a plurality of geometry data associated with the beverage container; and a controller coupled to the dispenser and the one or more sensors to control the dispenser's dispensation of the beverage, in accordance with a capacity of the beverage container determined based at least in part on the collected geometry data associated with the beverage container.

Example 2 may be example 1, wherein the one or more sensors may comprise one or more depth cameras or a plurality of stereo cameras.

Example 3 may be example 1, wherein the geometry data may comprise depth data associated with the beverage container.

Example 4 may be example 1, wherein the geometry data may comprise geometry data associated with a cross section of the beverage container.

Example 5 may be example 1, further comprising a mechanism to which the one or more sensors are attached, to move or facilitate the one or more sensors to be moved in place to sense and collect the geometry data associated with the beverage container.

Example 6 may be example 5, wherein the mechanism may further move or facilitate the one or more sensors to be moved away from a dispensation path of the dispenser after sensing and collecting the geometry data associated with the beverage container.

Example 7 may be example 5, wherein the mechanism may comprise one or more railings to which the one or more sensors are moveably attached.

Example 8 may be example 5, wherein the mechanism may comprise an arm that extends or swivels, to which the one or more sensors are attached at one end of the arm.

Example 9 may be example 1, wherein to control the dispenser, the controller may determine a volume of the beverage container, based at least in part on the collected geometry data associated with the beverage container.

Example 10 may be example 9, wherein to determine a volume of the beverage container, the controller may determine a size or a shape of the beverage container, based at least in part on the collected geometry data associated with the beverage container.

Example 11 may be example 9, wherein to determine a volume of the beverage container, the controller may construct a 3-dimensional (3D) model of the beverage container, based at least in part on the collected geometry data associated with the beverage container.

Example 12 may be example 1, wherein the beverage may comprise a plurality of ingredients, and the controller may control an amount of each of the ingredients the dispenser to dispense into the beverage container.

Example 13 may be any one of examples 1-12, wherein the controller may control the dispenser's dispensation of the beverage, further based on another factor, in addition to the determined capacity.

Example 14 may be example 13, wherein the other factor may comprise a selected one of an identity or a frequency of order of a user associated with the beverage container.

Example 15 may be example 14, wherein the one or more sensors may comprise a bio sensor to collect bin metric data of the user, and the controller may further determine the identity or frequency of order of the user, based at least in part on the collected bio metric data.

Example 16 may be example 15, wherein the bio sensor may comprise a camera to collect an image of the user, and the controller may further perform facial recognition to determine the identity of the user.

Example 17 may be example 14, further comprising a communication interface to receive the identity or frequency of order of the user.

Example 18 may be example 13, wherein the other factor may comprise a selected one of a time of day, a time of week, a time of month, a season of year, ambient temperature of the apparatus, or ambient humidity of the apparatus.

Example 19 may be example 18, wherein the one or more sensors may comprise one or more sensors to sense and collect data on the time of day, the time of week, the time of month, the season of year, the ambient temperature of the apparatus, or the ambient humidity of the apparatus.

Example 20 may be example 18, further comprising a communication interface to receive the time of day, the time of week, the time of month, the season of year, the ambient temperature of the apparatus, or the ambient humidity of the apparatus.

Example 21 may be any one of examples 1-12, wherein the one or more sensors may comprise a bio sensor to collect bio metric data of a user, and wherein the controller may determine presence or absence of a human hand in a dispensation path of the dispenser, based on the collected bio metric data or failure to collect bio metric data, and control the dispenser accordingly.

Example 22 may be a method for dispensing a beverage, comprising: sensing and collecting geometry data associated with a beverage container; determining a capacity of the beverage container, based at least in part on the collected geometry data associated with the beverage container; and controlling dispensing of the beverage into the beverage container in accordance with the determined capacity.

Example 23 may be example 22, wherein sensing may comprise sensing with one or one or more depth cameras or a plurality of stereo cameras.

Example 24 may be example 22, wherein the geometry data may comprise depth data associated with the beverage container.

Example 25 may be example 22, wherein the geometry data may comprise geometry data associated with a cross section of the beverage container.

Example 26 may be example 22, wherein sensing may further comprise moving one or more sensors in place to sense and collect the geometry data associated with the beverage container.

Example 27 may be example 26, wherein sensing may further comprise moving the one or more sensors away from a dispensation path of the dispenser after sensing and collecting the geometry data associated with the beverage container.

Example 28 may be example 22, wherein determining a capacity of the beverage container may comprise determining a volume of the beverage container, based at least in part on the collected geometry data associated with the beverage container.

Example 29 may be example 28, wherein determining a volume of the beverage container may comprise determining a size or a shape of the beverage container, based at least in part on the collected geometry data associated with the beverage container.

Example 30 may be example 28, determining a volume of the beverage container may comprise constructing a 3-dimensional (3D) model of the beverage container, based at least in part on the collected geometry data associated with the beverage container.

Example 31 may be example 22, wherein the beverage may comprise a plurality of ingredients, and controlling may comprise controlling dispensing an amount of each of the ingredients into the beverage container.

Example 32 may be example 21, wherein controlling dispensing is further based on another factor, in addition to the determined capacity.

Example 33 may be example 32, wherein the other factor may comprise a selected one of an identity or a frequency of order of a user associated with the beverage container.

Example 34 may be example 33, wherein sensing may further comprise collecting bio metric data of the user, and determining the identity or frequency of order of the user, based at least in part on the collected bio metric data.

Example 35 may be example 34, further comprising performing facial recognition to determine the identity of the user.

Example 36 may be example 33, further comprising receiving the identity or frequency of order of the user.

Example 37 may be example 32, wherein the other factor ma comprise a selected one of a time of day, a time of week, a time of month, a season of year, ambient temperature, or ambient humidity.

Example 38 may be example 37, further comprising collecting data on the time of day, the time of week, the time of month, the season of year, the ambient temperature, or the ambient humidity.

Example 39 may be example 37, further comprising receiving the time of day, the time of week, the time of month, the season of year, the ambient temperature, or the ambient humidity.

Example 40 may be example 22, further comprising collecting bio metric data of a user, and determining presence or absence of a human hand in a dispensation path for dispensing the beverage, based on the collected bio metric data or failure to collect bio metric data, and controlling the dispensing accordingly.

Example 41 may be at least one computer readable media (CRM) comprising a plurality of instructions to cause a beverage dispensing apparatus, in response to execution of the instructions by the beverage dispensing apparatus, to perform any one of the methods of 21-40.

Example 42 may be an apparatus for dispensing a beverage, comprising: means for sensing and collecting geometry data associated with a beverage container; means for determining a capacity of the beverage container, based at least in part on the collected depth data associated with the beverage container; and means for controlling dispensing the beverage into the beverage container in accordance with the inferred capacity.

Example 43 may be example 42, wherein means for sensing may comprise one or one or more depth cameras or a plurality of stereo cameras.

Example 44 ma be example 42, wherein the geometry data may comprise depth data associated with the beverage container.

Example 45 may be example 42, wherein the geometry data may comprise geometry data associated with a cross section of the beverage container.

Example 46 may be example 42, wherein means for sensing may further comprise means for moving one or more sensors in place to sense and collect the geometry data associated with the beverage container.

Example 47 may be example 46, wherein means for sensing may further comprise means for moving the one or more sensors away from a dispensation path of the dispenser after sensing and collecting the geometry data associated with the beverage container.

Example 48 may be example 42, wherein means for determining a capacity of the beverage container may comprise means for determining a volume of the beverage container, based at least in part on the collected geometry data associated with the beverage container.

Example 49 may be example 48, wherein means for determining a volume of the beverage container may comprise means for determining a size or a shape of the beverage container, based at least in part on the collected geometry data associated with the beverage container.

Example 50 may be example 48, wherein means for determining a volume of the beverage container may comprise means for constructing a 3-dimensional (3D) model of the beverage container, based at least in part on the collected geometry data associated with the beverage container.

Example 51 may be example 42, wherein the beverage may comprise a plurality of ingredients, and means for controlling may comprise means for controlling dispensing an amount of each of the ingredients into the beverage container.

Example 52 may be any one of examples 42-51, wherein means for controlling dispensing further base controlling on another factor, in addition to the determined capacity.

Example 53 may be example 52, wherein the other factor may comprise a selected one of an identity or a frequency of order of a user associated with the beverage container.

Example 54 may be example 53, wherein means for sensing may further comprise means for collecting bio metric data of the user, and means for determining the identity or frequency of order of the user, based at least in part on the collected bio metric data.

Example 55 may be example 54, further comprising means for performing facial recognition to determine the identity of the user.

Example 56 may be example 53, further comprising means for receiving the identity or frequency of order of the user.

Example 57 may be example 52, wherein the other factor may comprise a selected one of a time of day, a time of week, a time of month, a season of year, ambient temperature, or ambient humidity.

Example 58 may be example 57, further comprising means for collecting data on the time of day, the time of week, the time of month, the season of year, the ambient temperature, or the ambient humidity.

Example 59 may be example 57, further comprising means for receiving the time of clay, the time of week, the time of month, the season of year, the ambient temperature, or the ambient humidity.

Example 60 may be example 42-51, further comprising means for collecting bio metric data of a user, and means for determining presence or absence of a human hand in a dispensation path for dispensing the beverage, based on the collected bio metric data or failure to collect bio metric data, and controlling the dispensing accordingly.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus for dispensing beverages, comprising:
a dispenser, having a dispensing path, to dispense a beverage into a beverage container positioned in the dispensing path underneath the dispenser;
one or more sensors to sense and collect, from a head end of the dispensing path, a plurality of geometry data associated with the positioned beverage container, including a plurality of depth measures of the positioned beverage container; and
a controller coupled to the dispenser and the one or more sensors to control the one or more sensors in collecting, from the head end of the dispensing path, the plurality of geometry data associated with the positioned beverage container including the plurality of depth measures, to determine a capacity of the positioned beverage container based at least in part on the collected geometry data associated with the positioned beverage container including the plurality of depth measures, and to control the dispenser in dispensing the beverage into the positioned beverage container based at least in part on the determined capacity of the positioned beverage container.

2. The apparatus of claim 1, wherein the one or more sensors comprise one or more depth cameras or a plurality of stereo cameras.

3. The apparatus of claim 1, wherein the geometry data further comprises a length (L) and a width (W) associated with an opening of the positioned beverage container, wherein the capacity of the positioned beverage container is further determined based on the length (L) and the width (W) associated with the opening of the positioned beverage container.

4. The apparatus of claim 1, further comprising a mechanism to which the one or more sensors are attached, to move or facilitate the one or more sensors to be moved in place at the head end of the dispensing path to sense and collect, from the head end of the dispensing path, the geometry data associated with the beverage container, including the plurality of depth measures, and to be moved away from the dispensing path after sensing and collecting the geometry data associated with the beverage container.

5. The apparatus of claim 4, wherein the mechanism comprises one or more railings to which the one or more sensors are moveably attached to be moved into and out of the head end of the dispensing path, or an arm that extends or swivels, to which the one or more sensors are attached at one end of the arm, the arm being extendable or swivel-able into or out of the head end of the dispensing path.

6. The apparatus of claim 1, wherein the controller is to further control the dispenser's dispensation of the beverage in view of an identity and a frequency of order of a user associated with the positioned beverage container; and wherein the one or more sensors comprise a bio sensor to collect bio metric data of the user, and the controller is to further determine the identity and frequency of order of the user, based at least in part on the collected bio metric data.

7. The apparatus of claim 1, wherein the controller is to further control the dispenser's dispensation of the beverage in view of a selected one of a time of day, a time of week, a time of month, a season of year, ambient temperature of the apparatus, or ambient humidity of the apparatus; and wherein the one or more sensors comprise one or more sensors to sense and collect data on the time of day, the time of week, the time of month, the season of year, the ambient temperature of the apparatus, or the ambient humidity of the apparatus.

8. The apparatus of claim 1, wherein the one or more sensors comprise a bio sensor to collect bio metric data of a user, and wherein the controller is to determine presence or absence of a human hand in the dispensing path of the dispenser, based on the collected bio metric data or failure to collect bio metric data, and permit or stop the dispensing of the beverage into the positioned beverage container by the dispenser accordingly.

9. A method for dispensing a beverage, comprising:
sensing and collecting with one or more sensors, from a head end of a dispensing path of a dispenser arranged to dispense the beverage, geometry data associated with a beverage container positioned in the dispensing path, including a plurality of depth measures of the positioned beverage container;
determining a capacity of the beverage container, based at least in part on the collected plurality of depth measures of the positioned beverage container; and
controlling the dispenser in dispensing of the beverage into the beverage container in accordance with the determined capacity of the positioned beverage container.

10. The method of claim 9, wherein sensing comprises sensing with one or one or more depth cameras or a plurality of stereo cameras.

11. The method of claim 9, wherein sensing further comprises moving the one or more sensors into the head end of the dispensing path to sense and collect the geometry data associated with the beverage container, including the plurality of depth measures of the positioned beverage container; and moving the one or more sensors away from the head end of the dispensing path of the dispenser after sensing and collecting the geometry data associated with the beverage container.

12. The method of claim 9, wherein determining a capacity of the beverage container comprises determining a size, a shape, a volume or a 3-dimensional (3D) model of the beverage container, based at least in part on the collected geometry data associated with the beverage container, including the plurality of depth measures of the positioned beverage container, and a length (L) measure and a width (W) associated with an opening of the positioned beverage container.

13. The method of claim 9, wherein controlling further comprises controlling the dispenser in dispensing the beverage in view of an identity and a frequency of order of a user associated with the beverage container; and wherein sensing further comprises collecting bio metric data of the user, and determining further comprises determining the identity and frequency of order of the user, based at least in part on the collected bio metric data.

14. The method of claim 9, wherein controlling further comprises controlling the dispenser in dispensing the beverage in view of a selected one of a time of day, a time of week, a time of month, a season of year, ambient temperature, or ambient humidity; and the method further comprises collecting data on the time of day, the time of week, the time of month, the season of year, the ambient temperature, or the ambient humidity-.

15. The method of claim 12, further comprising collecting bio metric data of a user, and determining presence or absence of a human hand in the dispensing path, based on the collected bio metric data or failure to collect bio metric data, and permitting or stopping the dispenser in dispensing the beverage into the positioned beverage container accordingly.

16. At least one non-transitory computer readable media (CRM) comprising a plurality of instructions to cause a beverage dispensing apparatus, in response to execution of the instructions by the beverage dispensing apparatus, to:
sense and collect with one or more sensors, from a head end of dispensing path of a beverage dispenser of the beverage dispensing apparatus, geometry data associated with a beverage container positioned in the dispensing path underneath the beverage dispenser, including a plurality of depth measures of the positioned beverage container;
determine a capacity of the positioned beverage container, based at least in part on the collected depth measures of the positioned beverage container; and
control the beverage dispenser in dispensing the beverage into the positioned beverage container in accordance with the determined capacity.

17. The non-transitory CRM of claim 16, wherein to sense comprises to use one or one or more depth cameras or a plurality of stereo cameras.

18. The non-transitory CRM of claim 16, wherein to sense further comprises to move one or more sensors into the head end of the dispensing path above the positioned beverage container to sense and collect the geometry data associated with the beverage container; and to move the one or more sensors away from the head end of the dispensing path of the beverage dispenser after sensing and collecting the geometry data associated with the beverage container, including the plurality of depth measures of the positioned beverage container.

19. The non-transitory CRM of claim 16, wherein to determine a capacity of the beverage container comprises to determine a size, a shape, a volume or a 3-dimensional (3D) model of the beverage container, based at least in part on the collected geometry data associated with the beverage container, including the plurality of depth measures of the positioned beverage container, and a length (L) measure and a width (W) associated with an opening of the positioned beverage container.

* * * * *

UNITED STATES PATENT AND TRADEMARK OFFICE
CERTIFICATE OF CORRECTION

PATENT NO. : 10,894,707 B2  
APPLICATION NO. : 16/473195  
DATED : January 19, 2021  
INVENTOR(S) : Daniel Pohl et al.

Page 1 of 1

It is certified that error appears in the above-identified patent and that said Letters Patent is hereby corrected as shown below:

In the Claims

Column 14  
Line 12, Delete "-" after "humidity".

Signed and Sealed this  
Thirtieth Day of March, 2021

Drew Hirshfeld  
*Performing the Functions and Duties of the*  
*Under Secretary of Commerce for Intellectual Property and*  
*Director of the United States Patent and Trademark Office*